[12] United States Patent
Wyant et al.

(10) Patent No.: US 12,369,590 B2
(45) Date of Patent: Jul. 29, 2025

(54) METHODS OF CROP RESIDUAL MANAGEMENT WITH MICROALGAE COMPOSITIONS

(71) Applicant: HELIAE DEVELOPMENT, LLC, Gilbert, AZ (US)

(72) Inventors: Karl Wyant, Tempe, AZ (US); Edgard Jauregui, Casa Grande, AZ (US)

(73) Assignee: HELIAE DEVELOPMENT, LLC, Gilbert, AZ (US)

( * ) Notice: Subject to any disclaimer, the term of this patent is extended or adjusted under 35 U.S.C. 154(b) by 761 days.

(21) Appl. No.: 17/733,887

(22) Filed: Apr. 29, 2022

(65) Prior Publication Data
US 2022/0346385 A1    Nov. 3, 2022

Related U.S. Application Data

(60) Provisional application No. 63/181,855, filed on Apr. 29, 2021.

(51) Int. Cl.
*A01N 65/03*    (2009.01)
*A01N 37/04*    (2006.01)
*A01N 59/08*    (2006.01)
*A01N 59/16*    (2006.01)
*A01N 59/26*    (2006.01)
*A01N 63/20*    (2020.01)

(52) U.S. Cl.
CPC ............. *A01N 65/03* (2013.01); *A01N 37/04* (2013.01); *A01N 59/08* (2013.01); *A01N 59/16* (2013.01); *A01N 59/26* (2013.01); *A01N 63/20* (2020.01)

(58) Field of Classification Search
CPC ............ A01N 65/03; A01P 21/00; C05G 3/80
See application file for complete search history.

(56) References Cited

U.S. PATENT DOCUMENTS

2019/0008157 A1*  1/2019  Shinde ................. A01N 65/03
2021/0337805 A1*  11/2021 Shinde ................. A61P 31/10

* cited by examiner

Primary Examiner — Thane Underdahl
(74) Attorney, Agent, or Firm — Timothy M. Shropshire

(57) ABSTRACT

The present disclosure provides methods of decreasing a crop residue of a plant, enhancing the availability of a nutrient in a crop residue of a plant, increasing soil organic matter (SOM) with a crop residue of a plant, and reducing erosion with a crop residue of a plant by applying a composition comprising a culture of microalgae to the crop residue.

16 Claims, 8 Drawing Sheets

METHODS OF CROP RESIDUAL MANAGEMENT WITH MICROALGAE COMPOSITIONS

CROSS REFERENCE TO RELATED APPLICATIONS

This application claims the benefit of U.S. Provisional Patent Application No. 63/181,855, filed Apr. 29, 2021, the entire contents of which are incorporated by reference herein.

TECHNICAL FIELD

The present invention relates to methods of crop residual management via application of a composition comprising a culture of microalgae (e.g., *Chlorella*).

BACKGROUND

Crop residue generally refers to the vegetation (e.g., straw, chaff, husks, cobs) remaining on the soil surface following the performance of a given agricultural operation, such as a harvesting operation or a tillage operation. For various reasons, it is important to maintain a given amount of crop residue within a field following an agricultural operation. Specifically, crop residue remaining within the field can help in maintaining the content of organic matter within the soil and can also serve to protect the soil from wind and water erosion. However, in some cases, leaving an excessive amount of crop residue within a field can have a negative effect on the soil's productivity potential, such as by slowing down the warming of the soil at planting time and by slowing down seed germination. Leaving an insufficient amount of crop residue on the soil surface can be detrimental for soil quality, result in loss of soil organic matter (SOM), and increase soil erosion, whereas leaving an excessive amount can inhibit soil-seed contact, immobilize nitrogen, and cause soils to be cool and wet.

The amount of crop residue that can be sustainably removed varies and depends on many factors including the soil, climate, and plant characteristics. Various mechanical means of removing crop residue are available. However, the required equipment is costly and generally requires fossil fuels. Environmentally friendly and sustainable methods of crop residue management are needed.

SUMMARY

The present disclosure provides a method for decreasing a crop residue of a plant, the method comprising the step of applying a composition comprising a culture of microalgae to the crop residue, wherein the amount of crop residue after application of the composition is reduced compared to a substantially similar crop residue from the same plant without application of the composition.

In some aspects, the composition comprises a culture of *Aurantiochytrium, Botryococcus, Chlorella, Chlamydomonas, Desmodesmus, Dunaliella, Scenedesmus, Pavolv, Phaeodactylum, Nannochloropsis, Spirulina, Galdieria, Haematococcus, Isochrysis, Porphyridium, Schizochytrium, Thraustochytrium, Tetraselmis,* or a combination thereof. In one aspect, the composition comprises a culture of *Chlorella*. In another aspect, the culture of microalgae comprises whole cells, lysed cells, dried cells, cells that have been subjected to an extraction process, or a combination thereof.

In some aspects, the composition is applied at a rate of between about 0.1 qt/acre (0.2 L/ha) and about 10 qt/acre (23 L/ha).

In other aspects, the plant is soybeans, corn, winter wheat, hard red spring (HRS) wheat, durum wheat, canola, cotton, almonds, peas, beans, lentils, peanuts, rice, potatoes, sugar beets, sugar cane, chickpeas, or strawberries.

In yet other aspects, multiple applications of the composition are made to the crop residue.

In some aspects, the disclosure provides a method for enhancing the availability of a nutrient in a crop residue of a plant, the method comprising the step of applying a composition comprising a culture of microalgae to the crop residue, wherein the availability of the nutrient of the crop residue after application of the composition is increased compared to the nutrient in a substantially similar crop residue from the same plant without application of the composition.

In one aspect, the nutrient is nitrogen, phosphorus, potassium, calcium, magnesium, silicon, sulfur, iron, manganese, zinc, copper, boron, molybdenum, chlorine, sodium, aluminum, vanadium, nickel, cerium, dysprosium, erbium, europium, gadolinium, holmium, lanthanum, lutetium, neodymium, praseodymium, promethium, samarium, scandium, terbium, thulium, ytterbium, yttrium, or a combination thereof.

In another aspect, the disclosure relates to a method for increasing soil organic matter (SOM) with a crop residue of a plant, the method comprising the step of applying a composition comprising a culture of microalgae to the crop residue, wherein the SOM from the crop residue after application of the composition is increased compared to the SOM from a substantially similar crop residue from the same plant without application of the composition.

In other aspects, the disclosure relates to a method for reducing erosion with a crop residue of a plant, the method comprising the step of applying a composition comprising a culture of microalgae to the crop residue, wherein the soil erosion with the crop residue after application of the composition is decreased compared to the soil erosion with a substantially similar crop residue from the same plant without application of the composition.

In one aspect, the erosion is wind erosion and/or water erosion. In some aspects, the application of the microalgae-based compositions disclosed herein stimulates microbial growth, and the revitalized microbes help put the soil back together, over a longer period of time, thereby further reducing erosion even further via soil aggregation.

The methods disclosed herein provide various benefits including but not limited to improved efficiency of planting; reduced stress on planting equipment; reduced stress on seeds planted; and reduced need to till or work the soil leading to a more carbon neutral/planet friendly farm.

In some aspects, the methods disclosed herein result in warmer soil temperatures which lead to shorter dormancy periods allowing for earlier planting and multiple positive effects like longer growing seasons and increased yields.

DETAILED DESCRIPTION

Figure 1:
FIG. 1 depicts representative durum wheat stubble collected from fields treated only with burndown chemicals (i.e., herbicides) after harvest ("Grower Standard") or with the burndown chemicals and PHYCOTERRA® (whole cell *Chlorella* microalgae) applied at 2 quarts per acre ("PhycoTerra® 2 qt/a").
Figure 1:

As used herein and in the appended claims, the singular forms "a," "an," and "the" include plural referents unless the context clearly dictates otherwise. For example, "a" or "an" means "at least one" or "one or more."

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

The term "crop residue" as used herein refer materials left in an agricultural field or orchard after the crop has been harvested. These residues include stalks and stubble (stems), leaves, and seed pods. The crop residue can be ploughed directly into the ground, or burned first. In contrast, no-till, strip-till or reduced till agriculture practices are carried out to maximize crop residue cover.

As used herein, the term "soil organic matter" or "SOM" refers to the organic matter component of soil, consisting of plant and animal detritus at various stages of decomposition, cells and tissues of soil microbes, and substances that soil microbes synthesize. SOM provides numerous benefits to the physical and chemical properties of soil and its capacity to provide regulatory ecosystem services. SOM is especially critical for soil functions and quality. SOM also acts as a major sink and source of soil carbon (C). Although the C content of SOM varies considerably, SOM is ordinarily estimated to contain 58% C, and "soil organic carbon" (SOC) is often used as a synonym for SOM, with measured SOC content often serving as a proxy for SOM. Soil represents one of the largest C sinks on earth and is significant in the global carbon cycle and therefore for climate change mitigation.

The term "microalgae" as used herein refers to microscopic single cell organisms such as microalgae, cyanobacteria, algae, diatoms, dinoflagellates, freshwater organisms, marine organisms, or other similar single cell organisms capable of growth in phototrophic, mixotrophic, or heterotrophic culture conditions.

The term "auxiliary" as used herein refers to an inert ingredient commonly used in agricultural compositions. Examples of auxiliaries include, but are not limited to, extenders, solvents, diluents, emulsifiers, dispersants, binders, fixing agents, wetting agents, dyes, pigments, antifoams, preservatives, secondary thickeners, and stickers.

Analysis of the DNA sequence of the strain of *Chlorella* sp. described herein was done in the NCBI 18s rDNA reference database at the Culture Collection of Algae at the University of Cologne (CCAC) and showed substantial similarity (i.e., greater than 95%) with multiple known strains of *Chlorella* and *Micractinium*. Those of skill in the art will recognize that *Chlorella* and *Micractinium* appear closely related in many taxonomic classification trees for microalgae, and strains and species may be re-classified from time to time within the *Chlorella* and *Micractinium* genera. As would be understood in the art, the reclassification of various taxa is not unusual, and occurs as developments in science are made. Any disclosure in the specification regarding the classification of exemplary species or strains should be viewed in light of such developments. While the exemplary microalgae strain is referred to in the instant specification as *Chlorella*, it is recognized that microalgae strains in related taxonomic classifications with similar characteristics to the exemplary microalgae strain would reasonably be expected to produce similar results. Accordingly, any mention of *Chlorella* herein should be understood to include *Micractinium* species genetically and morphologically similar to species classified within the genus *Chlorella* as of the filing date.

Taxonomic classification has been in flux for organisms in the genus *Schizochytrium*. Some organisms previously classified as *Schizochytrium* have been reclassified as *Aurantiochytrium, Thraustochytrium*, or *Oblongichytrium*. See Yokoyama et al. Taxonomic rearrangement of the genus Schizochytrium sensu lato based on morphology, chemotaxonomic characteristics, and 18S rRNA gene phylogeny (Thrausochytriaceae, Labyrinthulomycetes): emendation for *Schizochytrium* and erection of *Aurantiochytrium* and *Oblongichytrium* gen. nov. Mycoscience (2007) 48:199-211. Those of skill in the art will recognize that *Schizochytrium, Aurantiochytrium, Thraustochytrium*, and *Oblongichytrium* appear closely related in many taxonomic classification trees for microalgae, and strains and species may be re-classified from time to time. Thus, for references throughout the instant specification for *Schizochytrium*, it is recognized that microalgae strains in related taxonomic classifications with similar characteristics to *Schizochytrium*, such as *Aurantiochytrium*, would reasonably be expected to produce similar results.

Crop Residue

Good management of crop residue can increase efficiency of irrigation and control of erosion. It can also provide nutrients for subsequent plantings. Table 1 presents several nutrients found in crop residues from corn, soy, and wheat and their estimated values based on current chemical fertilizer pricing.

TABLE 1

| Crop Residue Nutrient | Corn (lb./ton) | Soy (lb./ton) | Wheat (lb./ton) | USD ($) per lb. |
|---|---|---|---|---|
| N | 17 | 17 | 11 | $0.60 |
| $P_2O_5$ | 4 | 3 | 3 | $0.90 |
| $K_2O$ | 34 | 13 | 15 | $0.40 |
| S | 3 | 2 | 2 | $0.50 |
| Total Value of Crop Residue (USD ($) per ton) | $28.90 | $19.10 | $16.30 | |

Nutrients in most crop residue are not immediately available for crop use. Their release (called mineralization) occurs over a period of years. The biological processes involved in soil nutrient cycles are complex. As a rough guide, cereal straw releases about 10 to 15 percent of its nutrients and pea residues release about 35 percent of their nutrients by the next year.

The speed of mineralization depends on the nitrogen and lignin (fiber) content, soil moisture, temperature, and degree of mixing with the soil. Nitrogen is released fairly quickly from residue when the content is higher than 1.5 percent (such as in pea residues). In contrast, below 1.2 percent (such as cereal residue), soil-available nitrogen is fixed (i.e., via immobilization) by the microbes as they decompose the residue.

Thus, pea residue has short- and long-term benefits to soil fertility, whereas cereal straw can reduce next year's soil supply of available nutrients. Over time, the nutrients fixed by soil microbes and humus are released and available to crops.

In some aspects, treatment with the microalgae-based compositions disclosed herein enhances the availability of a nutrient in a crop residue from a plant compared to an untreated substantially similar crop residue from the same plant. In one aspect, the nutrient is calcium, magnesium, silicon, sulfur, iron, manganese, zinc, copper, boron, molybdenum, chlorine, sodium, aluminum, vanadium, nickel, cerium, dysprosium, erbium, europium, gadolinium, holmium, lanthanum, lutetium, neodymium, praseodymium, promethium, samarium, scandium, terbium, thulium, ytterbium, yttrium, or a combination thereof. In another aspect, the nutrient is nitrogen, phosphorus, potassium, or a combination thereof.

The crop residue can be from any one of a number of plants from a number of plant families. Non-limiting examples of plant families that can benefit from such compositions include plants from the following: Solanaceae, Fabaceae (Leguminosae), Poaceae, Roasaceae, Vitaceae, Brassicaeae (Cruciferae), Caricaceae, Malvaceae, Sapindaceae, Anacardiaceae, Rutaceae, Moraceae, Convolvulaceae, Lamiaceae, Verbenaceae, Pedaliaceae, Asteraceae (Compositae), Apiaceae (Umbelliferae), Araliaceae, Oleaceae, Ericaceae, Actinidaceae, Cactaceae, Chenopodiaceae, Polygonaceae, Theaceae, Lecythidaceae, Rubiaceae, Papveraceae, Illiciaceae Grossulariaceae, Myrtaceae, Juglandaceae, Bertulaceae, Cucurbitaceae, Asparagaceae (Liliaceae), Alliaceae (Liliceae), Bromeliaceae, Zingieraceae, Muscaceae, Areaceae, Dioscoreaceae, Myristicaceae, Annonaceae, Euphorbiaceae, Lauraceae, Piperaceae, Proteaceae, and Cannabaceae.

The Solanaceae plant family includes a large number of agricultural crops, medicinal plants, spices, and ornamentals in its over 2,500 species. Taxonomically classified in the Plantae kingdom, Tracheobionta (subkingdom), Spermatophyta (superdivision), Magnoliophyta (division), Manoliopsida (class), Asteridae (subclass), and Solanales (order), the Solanaceae family includes, but is not limited to, potatoes, tomatoes, eggplants, various peppers, tobacco, and petunias. Plants in the Solanaceae can be found on all the continents, excluding Antarctica, and thus have a widespread importance in agriculture across the globe.

The Rosaceae plant family includes flowering plants, herbs, shrubs, and trees. Taxonomically classified in the Plantae kingdom, Tracheobionta (subkingdom), Spermatophyta (superdivision), Magnoliophyta (division), Magnoliopsida (class), Rosidae (subclass), and Rosales (order), the Rosaceae family includes, but is not limited to, almond, apple, apricot, blackberry, cherry, nectarine, peach, plum, raspberry, strawberry, and quince.

The Fabaceae plant family (also known as the Leguminosae) comprises the third largest plant family with over 18,000 species, including a number of important agricultural and food plants. Taxonomically classified in the Plantae kingdom, Tracheobionta (subkingdom), Spermatophyta (superdivision), Magnoliophyta (division), Manoliopsida (class), Rosidae (subclass), and Fabales (order), the Fabaceae family includes, but is not limited to, soybeans, beans, green beans, peas, chickpeas, alfalfa, peanuts, sweet peas, carob, and liquorice. Plants in the Fabaceae family can range in size and type, including but not limited to, trees, small annual herbs, shrubs, and vines, and typically develop legumes. Plants in the Fabaceae family can be found on all the continents, excluding Antarctica, and thus have a widespread importance in agriculture across the globe. Besides food, plants in the Fabaceae family can be used to produce natural gums, dyes, and ornamentals.

The Poaceae plant family supplies food, building materials, and feedstock for fuel processing. Taxonomically classified in the Plantae kingdom, Tracheobionta (subkingdom), Spermatophyta (superdivision), Magnoliophyta (division), Liliopsida (class), Commelinidae (subclass), and Cyperales (order), the Poaceae family includes, but is not limited to, flowering plants, grasses, and cereal crops such as barely, corn, lemongrass, millet, oat, rye, rice, wheat, sugarcane, and sorghum. Types of turf grass found in Arizona include, but are not limited to, hybrid Bermuda grasses (e.g., 328 tifgrn, 419 tifway, tif sport).

The Vitaceae plant family includes flowering plants and vines. Taxonomically classified in the Plantae kingdom, Tracheobionta (subkingdom), Spermatophyta (superdivision), Magnoliophyta (division), Magnoliopsida (class), Rosidae (subclass), and Rhammales (order), the Vitaceae family includes, but is not limited to, grapes.

Microalgae

Non-limiting examples of microalgae that can be used in the compositions, mixtures, and methods of the invention are members of one of the following divisions: Chlorophyta, Cyanophyta (Cyanobacteria), and Heterokontophyta. In certain embodiments, the microalgae used in the compositions, mixtures, and methods of the invention are members of one of the following classes: Bacillariophyceae, Eustigmatophyceae, and Chrysophyceae. In certain embodiments, the microalgae used in the compositions and methods of the invention are members of one of the following genera: *Nannochloropsis, Chlorella, Desmodesmus, Dunaliella, Scenedesmus, Spirulina, Chlamydomonas, Galdieria, Isochrysis, Porphyridium, Schizochytrium, Tetraselmis, Thraustochytrium, Botryococcus,* and *Haematococcus.*

Non-limiting examples of microalgae species that can be used in the compositions, mixtures, and methods of the present invention include: *Achnanthes orientalis, Agmenellum* spp., *Amphiprora hyaline, Amphora coffeiformis, Amphora coffeiformis* var. *linea, Amphora coffeiformis* var. *punctata, Amphora coffeiformis* var. *taylori, Amphora coffeiformis* var. *tenuis, Amphora delicatissima, Amphora delicatissima* var. *capitata, Amphora* sp., *Anabaena, Ankistrodesmus, Ankistrodesmus falcatus, Aurantiochytrium,* sp. *Boekelovia hooglandii, Borodinella* sp., *Botryococcus braunii, Botryococcus sudeticus, Bracteococcus minor, Bracteococcus medionucleatus, Carteria, Chaetoceros gracilis, Chaetoceros muelleri, Chaetoceros muelleri* var. *subsalsum, Chaetoceros* sp., *Chlamydomonas* sp., *Chlamydomas perigranulata, Chlorella anitrata, Chlorella antarctica, Chlorella aureoviridis, Chlorella Candida, Chlorella capsulate, Chlorella desiccate, Chlorella ellipsoidea Chlorella emersonii, Chlorella fusca, Chlorella fusca* var. *vacuolate, Chlorella glucotropha, Chlorella infusionum, Chlorella infusionum* var. *actophila, Chlorella infusionum* var. *auxenophila, Chlorella kessleri, Chlorella lobophora, Chlorella luteoviridis, Chlorella luteoviridis* var. *aureoviridis, Chlorella luteoviridis* var. *lutescens, Chlorella miniata, Chlorella minutissima, Chlorella mutabilis, Chlorella nocturna, Chlorella ovalis, Chlorella parva, Chlorella photophila, Chlorella pringsheimii, Chlorella protothecoides, Chlorella protothecoides* var. *acidicola, Chlorella regularis, Chlorella regularis* var. *minima, Chlorella regularis* var. *umbricata, Chlorella reisiglii, Chlorella saccharophila, Chlorella saccharophila* var. *ellipsoidea, Chlorella salina, Chlorella simplex, Chlorella sorokiniana, Chlorella* sp., *Chlorella sphaerica, Chlorella stigmatophora, Chlorella vanniellii, Chlorella vulgaris, Chlorella vulgaris* fo. *tertia, Chlorella vulgaris* var. *autotrophica, Chlorella vulgaris* var. *viridis, Chlorella vulgaris* var. *vulgaris, Chlorella vulgaris* var. *vulgaris* fo. *tertia, Chlorella vulgaris* var. *vulgaris* fo. *viridis, Chlorella xanthella, Chlorella zofingiensis, Chlorella trebouxioides, Chlorella vulgaris, Chlorococcum infusionum, Chlorococcum* sp., *Chlorogonium, Chroomonas* sp., *Chrysosphaera* sp., *Cricosphaera* sp., *Crypthecodinium cohnii, Cryptomonas* sp., *Cyclotella cryptica, Cyclotella meneghiniana, Cyclotella* sp., *Desmodesmus* sp., *Dunaliella* sp., *Dunaliella bardawil, Dunaliella bioculata, Dunaliella granulate, Dunaliella maritime, Dunaliella minuta, Dunaliella parva, Dunaliella peircei, Dunaliella primolecta, Dunaliella salina, Dunaliella terricola, Dunaliella tertiolecta, Dunaliella viridis, Dunaliella tertiolecta, Eremosphaera viridis, Eremosphaera* sp., *Ellipsoidon* sp., *Euglena* spp., *Franceia* sp., *Fragilaria crotonensis, Fragilaria* sp., *Gleocapsa* sp., *Gloeothamnion* sp., *Haematococcus pluvialis, Hymenomonas* sp., *Isochrysis* aff. *galbana, Isochrysis galbana, Lepocinclis, Micractinium, Micractinium, Monoraphidium minutum, Monoraphidium* sp., *Nannochloris* sp., *Nannochloropsis sauna, Nannochloropsis* sp., *Navicula acceptata, Navicula biskanterae, Navicula pseudotenelloides, Navicula pelliculosa, Navicula saprophila, Navicula* sp., *Nephrochloris* sp., *Nephroselmis* sp., *Nitschia communis, Nitzschia alexandrina, Nitzschia closterium, Nitzschia communis, Nitzschia dissipata, Nitzschia frustulum, Nitzschia hantzschiana, Nitzschia inconspicua, Nitzschia intermedia, Nitzschia microcephala, Nitzschia pusilla, Nitzschia pusilla elliptica, Nitzschia pusilla monoensis, Nitzschia quadrangular, Nitzschia* sp., *Ochromonas* sp., *Oocystis parva, Oocystis pusilla, Oocystis* sp., *Oscillatoria limnetica, Oscillatoria* sp., *Oscillatoria subbrevis, Parachlorella kessleri, Pascheria acidophila, Pavlova* sp., *Phaeodactylum tricornutum, Phagus, Phormidium, Porphyridium, Platymonas* sp., *Pleurochrysis camerae, Pleurochrysis dentate, Pleurochrysis* sp., *Prototheca wickerhamii, Prototheca stagnora, Prototheca portoricensis, Prototheca moriformis, Prototheca zopfii, Pseudochlorella aquatica, Pyramimonas* sp., *Pyrobotrys, Rhodococcus opacus, Sarcinoid chrysophyte, Scenedesmus armatus, Schizochytrium, Spirogyra, Spirulina platensis, Stichococcus* sp., *Synechococcus* sp., *Synechocystisf, Tagetes erecta, Tagetes patula, Tetraedron, Tetraselmis* sp., *Tetraselmis suecica, Thalassiosira weissflogii, Thraustochytrium* sp., and *Viridiella fridericiana.*

Processing of Microalgae

By artificially controlling aspects of the microalgae culturing process such as the organic carbon feed (e.g., acetic acid, acetate), oxygen levels, pH, and light, the culturing process differs from the culturing process that microalgae experiences in nature. In addition to controlling various aspects of the culturing process, intervention by human operators or automated systems occurs during the non-axenic mixotrophic culturing of microalgae through contamination control methods to prevent the microalgae from being overrun and outcompeted by contaminating organisms (e.g., fungi, bacteria). Contamination control methods for microalgae cultures are known in the art and such suitable contamination control methods for non-axenic mixotrophic microalgae cultures are disclosed in WO2014/074769A2 (Ganuza, et al.), hereby incorporated by reference. By intervening in the microalgae culturing process, the impact of the contaminating microorganisms can be mitigated by suppressing the proliferation of containing organism populations and the effect on the microalgal cells (e.g., lysing, infection, death, clumping). Thus, through artificial control of aspects of the culturing process and intervening in the culturing process with contamination control methods, the microalgae culture produced as a whole and used in the described inventive compositions differs from the culture that results from a microalgae culturing process that occurs in nature.

A composition comprising microalgae can be stabilized by heating and cooling in a pasteurization process. In certain aspects, the active ingredients of the microalgae based compositions maintain effectiveness in promoting degradation of crop residue after being subjected to the heating and cooling of a pasteurization process. In other embodiments, compositions with whole cells or processed cells (e.g., dried, lysed, extracted) of microalgae cells may not need to be stabilized by pasteurization. For example, microalgae cells that have been processed, such as by drying, lysing, and extraction, or extracts can include such low levels of bacteria that a composition can remain stable without being subjected to the heating and cooling of a pasteurization process.

In some embodiments, the composition is lysed. Lysing is a technique where the cell membrane of a cell is ruptured, which releases lysate, the fluid contents of lysed cells, from the cells. As an example, the lysing process can comprise anything suitable that ruptures a cell membrane. For example, a bead mill may be used for lysing, where feedstock biomass solids can be dispersed and wetted (e.g., placed into a liquid phase). In this example the bead mill can utilize ceramic, glass, or metal beats (e.g., of a suitable size for the desired result) disposed in a chamber, such as a rotating cylinder, to collide with and mechanically macerate the solid biomass in the mill, which can help rupture the cell walls (e.g., the hydrogen bonds that hold together a cell membrane). Accordingly, in this example, the whole biomass may be lysed with water at cooler temperatures, with the resulting lysate comprising lipids in the form of an oil, biomass cell contents and unbroken biomass solid (e.g., non-target portion of biomass), and water.

In another aspect, the biomass is lysed using a shear mill. A shear mill utilizes a rotating impeller or high-speed rotor to create flow and shear of its contents. This causes the solid particles, such as biomass solid, to rupture due to shear stress.

In another aspect, the biomass is lysed using a pulsed electron field (PEF), high pressure homogenization, enzymes, and/or a chemical means (e.g., with a solvent).

In some embodiments and Examples below, the microalgae composition may be referred to as PHYCOTERRA®, PHYCOTERRA® ORGANIC, PHYCOTERRA® ST or PHYCOTERRA® FX. The PHYCOTERRA®, PHYCOTERRA® ORGANIC, PHYCOTERRA® ST or PHYCOTERRA® FX Chlorella microalgae composition is a microalgae composition comprising Chlorella sp. The PHYCOTERRA® and PHYCOTERRA® ORGANIC products contain whole cell Chlorella biomass while the PHYCOTERRA® ST and PHYCOTERRA® FX contain lysed cell Chlorella biomass. The PHYCOTERRA® Chlorella microalgae composition treatments were prepared by growing the Chlorella in non-axenic acetic acid supplied mixotrophic conditions, increasing the concentration of Chlorella using a centrifuge, pasteurizing the concentrated Chlorella at between 65° C.-75° C. for between 90-150 minutes, adding potassium sorbate and phosphoric acid to stabilize the pH of the Chlorella, and then adjusting the whole biomass treatment to the desired concentration. The PHYCOTERRA® Chlorella microalgae composition may comprise approximately 10% w/w of Chlorella microalgae cells. Furthermore, the PHYCOTERRA® Chlorella microalgae composition may comprise between approximately 0.3% potassium sorbate and between approximately 0.5%-1.5% phosphoric acid to stabilize the pH of the Chlorella to between 3.0-4.0 and 88.2%-89.2% water. It should be clearly understood, however, that other variations of the PHYCOTERRA® Chlorella microalgae composition, including variations in the microalgae strains, variations in the stabilizers, and/or variations in the % composition of each component may be used and may achieve similar results.

In some embodiments and Examples below, the microalgae composition may be an OMRI certified microalgae composition referred to as TERRENE®. The OMRI certified TERRENE® Chlorella microalgae composition is a microalgae composition comprising Chlorella. The OMRI certified TERRENE® Chlorella microalgae composition treatments were prepared by growing the Chlorella in non-axenic acetic acid supplied mixotrophic conditions, increasing the concentration of Chlorella using a centrifuge, pasteurizing the concentrated Chlorella at between 65° C.-75° C. for between 90-150 minutes, adding citric acid to stabilize the pH of the Chlorella, and then adjusting the whole biomass treatment to the desired concentration. The OMRI certified TERRENE® Chlorella microalgae composition may comprise approximately 10% w/w of Chlorella microalgae cells. Furthermore, the OMRI certified TERRENE® Chlorella microalgae composition may comprise between approximately 0.5%-2.0% citric acid to stabilize the pH of the Chlorella to between 3.0-4.0 and 88%-89.5% water. It should be clearly understood, however, that other variations of the OMRI certified TERRENE® Chlorella microalgae composition, including variations in the microalgae strains, variations in the stabilizers, and/or variations in the % composition of each component may be used and may achieve similar results.

Methods of Application

In some embodiments, the composition comprising a culture of microalgae can include 2.5-30% solids by weight of microalgae cells (i.e., 2.5-30 g of microalgae cells/100 mL of the composition). In some embodiments, the composition can include 2.5-5% solids by weight of microalgae cells (i.e., 2.5-5 g of microalgae cells/100 mL of the composition). In some embodiments, the composition can include 5-20% solids by weight of microalgae cells. In some embodiments, the composition can include 5-15% solids by weight of microalgae cells. In some embodiments, the composition can include 5-10% solids by weight of microalgae cells. In some embodiments, the composition can include 10-20% solids by weight of microalgae cells. In some embodiments, the composition can include 10-20% solids by weight of microalgae cells. In some embodiments, the composition can include 20-30% solids by weight of microalgae cells. In some embodiments, further dilution of the microalgae cells percent solids by weight can occur before application for low concentration applications of the composition.

In some embodiments, the composition can include less than 1% by weight of microalgae biomass or extracts (i.e., less than 1 g of microalgae derived product/100 mL of the composition). In some embodiments, the composition can include less than 0.9% by weight of microalgae biomass or extracts. In some embodiments, the composition can include less than 0.8% by weight of microalgae biomass or extracts. In some embodiments, the composition can include less than 0.7% by weight of microalgae biomass or extracts. In some embodiments, the composition can include less than 0.6% by weight of microalgae biomass or extracts. In some embodiments, the composition can include less than 0.5% by weight of microalgae biomass or extracts. In some embodiments, the composition can include less than 0.4% by weight of microalgae biomass or extracts. In some embodiments, the composition can include less than 0.3% by weight of microalgae biomass or extracts. In some embodiments, the composition can include less than 0.2% by weight of microalgae biomass or extracts. In some embodiments, the composition can include less than 0.1% by weight of microalgae biomass or extracts. In some embodiments, the composition can include at least 0.0001% by weight of microalgae biomass or extracts. In some embodiments, the composition can include at least 0.001% by weight of microalgae biomass or extracts. In some embodiments, the composition can include at least 0.01% by weight of microalgae biomass or extracts. In some embodiments, the composition can include at least 0.1% by weight of microalgae biomass or extracts. In some embodiments, the composition can include 0.0001-1% by weight of microalgae biomass or extracts. In some embodiments, the composition can include 0.0001-0.001% by weight of microalgae biomass or extracts. In some embodiments, the composition can include 0.001-0.01% by weight of microalgae biomass or extracts. In some embodiments, the composition can include 0.01-0.1% by weight of microalgae biomass or extracts. In some embodiments, the composition can include 0.1-1% by weight of microalgae biomass or extracts.

In some embodiments, the microalgae biomass or extract based composition can be applied at a rate in a range as low as about 0.001-10 gallons per acre, or as high as up to 150 gallons per acre. The compositions disclosed herein may be applied in any desired manner, such as in the form of a soil drench and/or directly in-furrow.

In some embodiments, the microalgae based composition may be applied through a drip system. Depending on the soil type, the relative concentrations of sand, silt and clay, and the root depth, the volume that is irrigated with a drip system may be about ⅓ of the total soil volume. The soil has an approximate weight of 4,000,000 lbs. per acre one foot deep.

In some embodiments, the microalgae based composition may be applied through a pivot irrigation application. The quantity and frequency of water delivered over an area by a pivot irrigation system is dependent on the soil type and crop. Applications may be 0.5 inch or more and the exact demand for water can be quantitatively measured using soil moisture gauges. In some embodiments, the microalgae based composition may be applied in a broadcast application. In certain aspects, the microalgae based composition are applied at 0.1-150 gallons per acre, 0.1-50 gallons per acre, or 0.1-10 gallons per acre.

The present invention involves the use of a microalgae composition. Microalgae compositions, methods of preparing microalgae compositions, and methods of applying the microalgae compositions to plants are disclosed in WO 2017/218896 A1 (Shinde et al.) entitled "Microalgae-Based Composition, and Methods of its Preparation and Application to Plants," which is incorporated herein in full by reference. In one or more embodiments, the microalgae composition may comprise approximately 10%-10.5% w/w of *Chlorella* microalgae cells. In one or more embodiments, the microalgae composition may also comprise one of more stabilizers, such as potassium sorbate, phosphoric acid, ascorbic acid, sodium benzoate, citric acid, or the like, or any combination thereof. For example, in one or more embodiments, the microalgae composition may comprise approximately 0.3% w/w of potassium sorbate or another similar compound to stabilize its pH and may further comprise approximately 0.5-1.5% w/w phosphoric acid or another similar compound to prevent the growth of contaminants. As a further example, in one or more embodiments where it is desired to use an OMRI (Organic Materials Review Institute) certified organic composition, the microalgae composition may comprise 1.0-2.0% w/w citric acid to stabilize its pH, and may not contain potassium sorbate or phosphoric acid. In one or more embodiments, the pH of the microalgae composition may be stabilized to between 3.0-4.0.

In some embodiments, the composition is a liquid and substantially includes water. In some embodiments, the composition can include 70-99% water. In some embodiments, the composition can include 85-95% water. In some embodiments, the composition can include 70-75% water. In some embodiments, the composition can include 75-80% water. In some embodiments, the composition can include 80-85% water. In some embodiments, the composition can include 85-90% water. In some embodiments, the composition can include 90-95% water. In some embodiments, the composition can include 95-99% water. The liquid nature and high-water content of the composition facilitates administration of the composition in a variety of manners, such as but not limit to: flowing through an irrigation system, flowing through an above ground drip irrigation system, flowing through a buried drip irrigation system, flowing through a central pivot irrigation system, sprayers, sprinklers, and water cans.

In some embodiments, the microalgae based composition can be supplied to the soil by injection into a low volume irrigation system, such as but not limited to a drip irrigation system supplying water beneath the soil through perforated conduits or at the soil level by fluid conduits hanging above the ground or protruding from the ground. In some embodiments, the microalgae based composition can be supplied to the soil by a soil drench method wherein the composition is poured on the soil.

The microalgae based composition can be diluted to a lower concentration for an effective amount in a soil application by mixing a volume of the composition in a volume of water. The percent solids of microalgae sourced components resulting in the diluted composition can be calculated by the multiplying the original concentration in the composition by the ratio of the volume of the composition to the volume of water. Alternatively, the grams of microalgae sourced components in the diluted composition can be calculated by the multiplying the original grams of microalgae sourced components per 100 mL by the ratio of the volume of the composition to the volume of water.

The rate of application of the microalgae based composition at the desired concentration can be expressed as a volume per area. In some embodiments, the rate of application of the microalgae based composition in a soil application can include a rate in the range of 50-150 gallons/acre. In some embodiments, the rate of application of the microalgae based composition in a soil application can include a rate in the range of 75-125 gallons/acre. In some embodiments, the rate of application of the microalgae based composition in a soil application can include a rate in the range of 50-75 gallons/acre. In some embodiments, the rate of application of the microalgae based composition in a soil application can include a rate in the range of 75-100 gallons/acre. In some embodiments, the rate of application of the microalgae based composition in a soil application can include a rate in the range of 100-125 gallons/acre. In some embodiments, the rate of application of the microalgae based composition in a soil application can include a rate in the range of 125-150 gallons/acre.

In some embodiments, the rate of application of the microalgae based composition in a soil application can include a rate in the range of 10-50 gallons/acre. In some embodiments, the rate of application of the microalgae based composition in a soil application can include a rate in the range of 10-20 gallons/acre. In some embodiments, the rate of application of the microalgae based composition in a soil application can include a rate in the range of 20-30 gallons/acre. In some embodiments, the rate of application of the microalgae based composition in a soil application can include a rate in the range of 30-40 gallons/acre. In some embodiments, the rate of application of the microalgae based composition in a soil application can include a rate in the range of 40-50 gallons/acre.

In some embodiments, the rate of application of the microalgae based composition in a soil application can include a rate in the range of 0.01-10 gallons/acre. In some embodiments, the rate of application of the microalgae based composition in a soil application can include a rate in the range of 0.01-0.1 gallons/acre. In some embodiments, the rate of application of the microalgae based composition in a soil application can include a rate in the range of 0.1-1.0 gallons/acre. In some embodiments, the rate of application of the microalgae based composition in a soil application can include a rate in the range of 1-2 gallons/acre. In some embodiments, the rate of application of the microalgae based composition in a soil application can include a rate in the range of 2-3 gallons/acre. In some embodiments, the rate of application of the microalgae based composition in a soil application can include a rate in the range of 3-4 gallons/acre. In some embodiments, the rate of application of the microalgae based composition in a soil application can include a rate in the range of 4-5 gallons/acre. In some embodiments, the rate of application of the microalgae based composition in a soil application can include a rate in the range of 5-10 gallons/acre.

In some embodiments, the rate of application of the microalgae based composition in a soil application can include a rate in the range of 2-20 liters/acre. In some embodiments, the rate of application of the microalgae based composition in a soil application can include a rate in the range of 3.7-15 liters/acre. In some embodiments, the rate of application of the microalgae based composition in a soil application can include a rate in the range of 2-5 liters/acre. In some embodiments, the rate of application of the microalgae based composition in a soil application can include a rate in the range of 5-10 liters/acre. In some embodiments, the rate of application of the microalgae based composition in a soil application can include a rate in the range of 10-15 liters/acre. In some embodiments, the rate of application of the microalgae based composition in a soil application can include a rate in the range of 15-20 liters/acre.

EXAMPLES

Example 1

PHYCOTERRA® (Whole Cell *Chlorella* Microalgae) Reduces Crop Residue in Durum Wheat Fields after Harvest A field trial near Minot, N.D. was conducted with durum wheat crop residue, following harvest in October 2020. After harvest, burndown chemicals were applied to the crop residue on a section of the field, and PHYCOTERRA® (whole cell *Chlorella* microalgae) was applied to crop residue on a separate section of the field. The burndown chemicals used were ROUNDUP® (glyphosate), applied at a rate of 32 oz/acre, and PANOFLEX® (thifensulfuron-methyl and tribenuron methyl), applied at a rate of 30 oz/acre. PHYCOTERRA® (whole cell *Chlorella* microalgae) was applied at a rate of 2 quarts per acre for comparison with the section of field receiving only burndown chemicals ("Grower Standard"). The field was left dormant over the winter months until March 2021 when the field was evaluated for remaining crop residue.

Visual observation of the field and aerial photos of the field identified a decrease in crop residue in that section of the field treated with PHYCOTERRA® (whole cell *Chlorella* microalgae). The section of the field treated only with the burndown chemicals ("Grower Standard") had thicker crop residue on the soil, more intact crop residue (i.e., less breakdown), and straw (i.e., stubble) with a brighter yellow color and longer stems. In contrast, the section of the field treated only with PHYCOTERRA® (whole cell *Chlorella* microalgae) ("PHYCOTERRA® 2 qt/a") had greater degradation of crop residue, straw (i.e., stubble) with a more grey or black color, and greater moisture in the crop residue (see FIG. 1).

Figure 2:
FIG. 2 depicts representative dried durum wheat stubble collected from 12-inch by 10-inch areas in fields treated only with burndown chemicals (i.e., herbicides) after harvest ("Grower Standard") or with the burndown chemicals and PHYCOTERRA® (whole cell *Chlorella* microalgae) applied at 2 quarts per acre ("PhycoTerra®").

To quantify the amount of crop residue in the two sections of field, wet samples of stubble were collected from each section of field in representative 12-inch by 10-inch areas and were dried at 275° F. for 30 minutes. The dried samples were weighed, and the average dry weights from the Grower Standard section and the PHYCOTERRA® section of the field were compared. This comparison revealed that PHYCOTERRA®-treated wheat stubble had an average dry weight 36% less than the average dry weight of wheat stubble from the Grower Standard field section (see FIG. 2).

Example 2

PHYCOTERRA® (Whole Cell *Chlorella* Microalgae) Reduces Crop Residue in Spring Wheat Fields after Harvest A field trial near Whitewater, Wisc. was conducted with spring wheat crop residue (sandy loam soil), following harvest in October 2021. After harvest, PHYCOTERRA® (whole cell *Chlorella* microalgae) was applied to crop residue on sections of field at rates of 1 and 2 quarts per acre for comparison with sections of field containing crop residue not treated with PHYCOTERRA® ("Grower Standard"). The field sections were left dormant over the winter months until March 2022 when the sections were evaluated for remaining crop residue.

The untreated section of field ("Grower Standard") had thicker crop residue on the soil and more intact crop residue (i.e., less breakdown) than the section of the field treated only with PHYCOTERRA® (whole cell *Chlorella* microalgae). To quantify the amount of crop residue in the treated vs. untreated sections of field, wet samples of the residue were collected from each section of field in representative 4-inch by 4-inch areas and dried at 140° F. for 24 hours. The dried samples were weighed, and the average dry weights from the Grower Standard section and the PHYCOTERRA® section of the field were compared. This comparison revealed that the average dry weight of crop residue treated with PHYCOTERRA® was 8% ("PHYCOTERRA® 1 qt/acre treatment) and 13% ("PHYCOTERRA® 2 qt/acre treatment) less than the average dry weight of the untreated (i.e., Grower standard) crop residue.

Example 3

PHYCOTERRA® (Whole Cell *Chlorella* Microalgae) Reduces Crop Residue in Soybean Fields after Harvest A field trial near Whitewater, Wisc. was conducted with soybean crop residue (silt loam soil), following harvest in October 2021. After harvest, PHYCOTERRA® (whole cell *Chlorella* microalgae) was applied to crop residue on sections of field at rates of 1 and 2 quarts per acre for comparison with sections of field containing crop residue not treated with PHYCOTERRA® ("Grower Standard"). The field sections were left dormant over the winter months until March 2022 when the sections were evaluated for remaining crop residue.

The untreated section of field ("Grower Standard") had thicker crop residue on the soil and more intact crop residue (i.e., less breakdown) than the section of the field treated only with PHYCOTERRA® (whole cell *Chlorella* microalgae). To quantify the amount of crop residue in the treated vs. untreated sections of field, wet samples of the residue were collected from each section of field in representative 4-inch by 4-inch areas and dried at 140° F. for 24 hours. The dried samples were weighed, and the average dry weights from the Grower Standard section and the PHYCOTERRA® section of the field were compared. This comparison revealed that the average dry weight of crop residue treated with PHYCOTERRA® was 9% ("PHYCOTERRA® 1 qt/acre treatment) and 12% ("PHYCOTERRA® 2 qt/acre treatment) less than the average dry weight of the untreated (i.e., Grower standard) crop residue.

Example 4

PHYCOTERRA® (Whole Cell *Chlorella* Microalgae) Reduces Crop Residue in Corn Fields after Harvest.

A field trial near Whitewater, Wisconsin was conducted with corn crop residue (sandy loam soil), following harvest in October 2021. After harvest, PHYCOTERRA® (whole cell *Chlorella* microalgae) was applied to crop residue on sections of field at rates of 1 and 2 quarts per acre for comparison with sections of field containing crop residue not treated with PHYCOTERRA® ("Grower Standard"). The field sections were left dormant over the winter months until March 2022 when the sections were evaluated for remaining crop residue.

The untreated section of field ("Grower Standard") had thicker crop residue on the soil and more intact crop residue (i.e., less breakdown) than the section of the field treated only with PHYCOTERRA® (whole cell *Chlorella* microalgae). To quantify the amount of crop residue in the treated vs. untreated sections of field, wet samples of the residue were collected from each section of field in representative 4-inch by 4-inch areas and dried at 140° F. for 24 hours. The dried samples were weighed, and the average dry weights from the Grower Standard section and the PHYCOTERRA® section of the field were compared. This comparison revealed that the average dry weight of crop residue treated with PHYCOTERRA® was 11% ("PHYCOTERRA® 1 qt/acre treatment) and 15% ("PHYCOTERRA® 2 qt/acre treatment) less than the average dry weight of the untreated (i.e., Grower standard) crop residue.

Example 5

PHYCOTERRA® (Whole Cell *Chlorella* Microalgae) Applied after Harvest of Durum Wheat, Soybeans, or Canola Increases Soil Temperature and Soil Frost Depth.

Three independent field trials were conducted with durum wheat, soybeans, or canola. In each field trial, following harvest, burndown chemicals were applied to crop residue on a section of the field, and PHYCOTERRA® (whole cell *Chlorella* microalgae) was applied to crop residue on a separate section of the field. The burndown chemicals used were ROUNDUP® (glyphosate), applied at a rate of 32oz/acre, and PANOFLEX® (thifensulfuron-methyl and tribenuron methyl), applied at a rate of 30z/acre. PHYCOTERRA® (whole cell *Chlorella* microalgae) was applied at a rate of 2 quarts per acre ("PHYCOTERRA® 2 qt/a") for comparison with the section of field receiving only burndown chemicals ("Grower Standard"). Harvest and treatments occurred in October 2020, and all evaluations of soil temperature and soil frost depth occurred the following March.

Figure 3A:
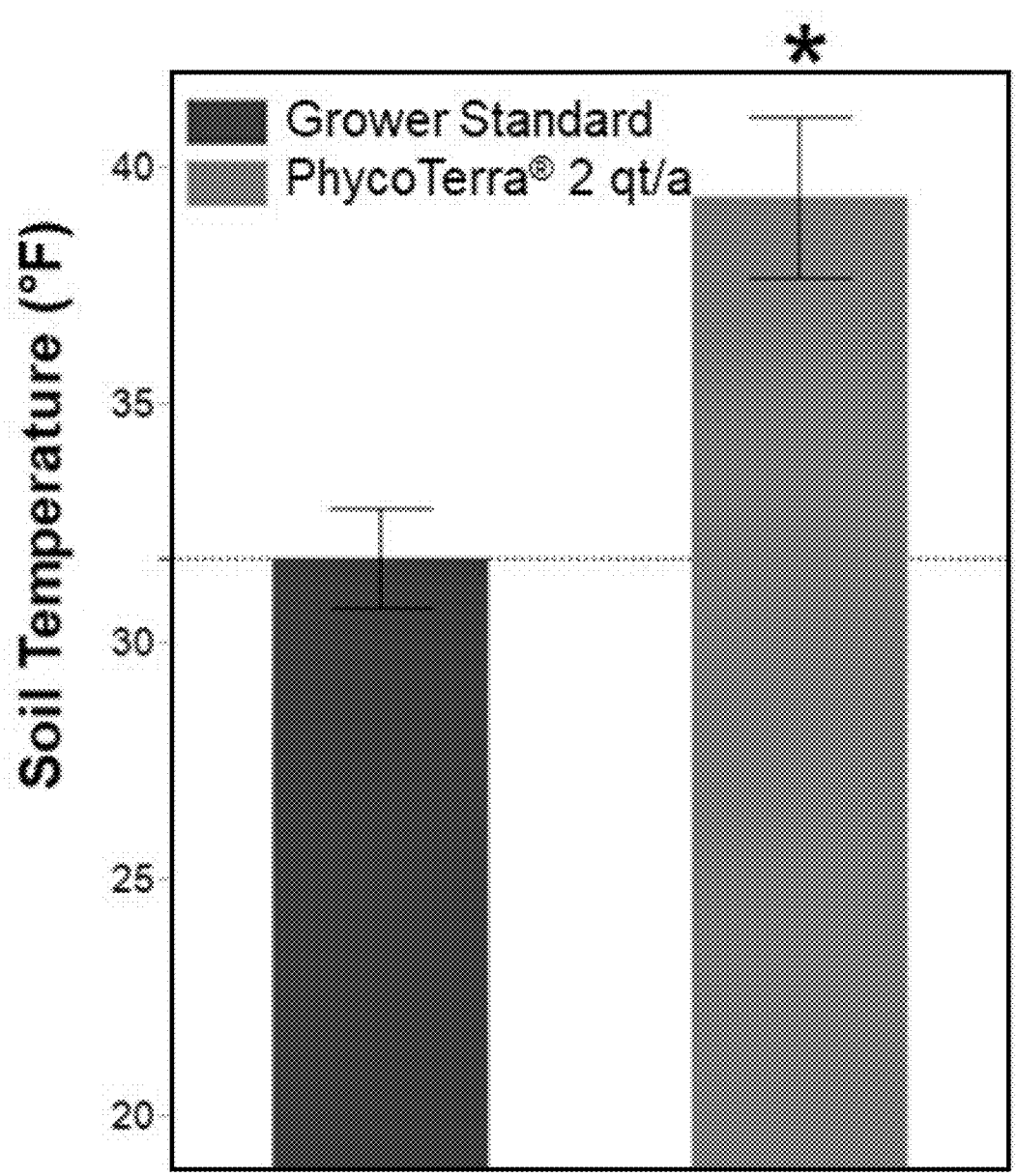
FIG. 3A depicts the average soil temperature at 6 inches of soil depth of fields treated only with burndown chemicals (i.e., herbicides) ("Grower Standard") or with the burndown chemicals and PHYCOTERRA® (whole cell *Chlorella* microalgae) applied at 2 quarts per acre ("PhycoTerra® 2 qt/a") after harvest of durum wheat.
Figure 3B:
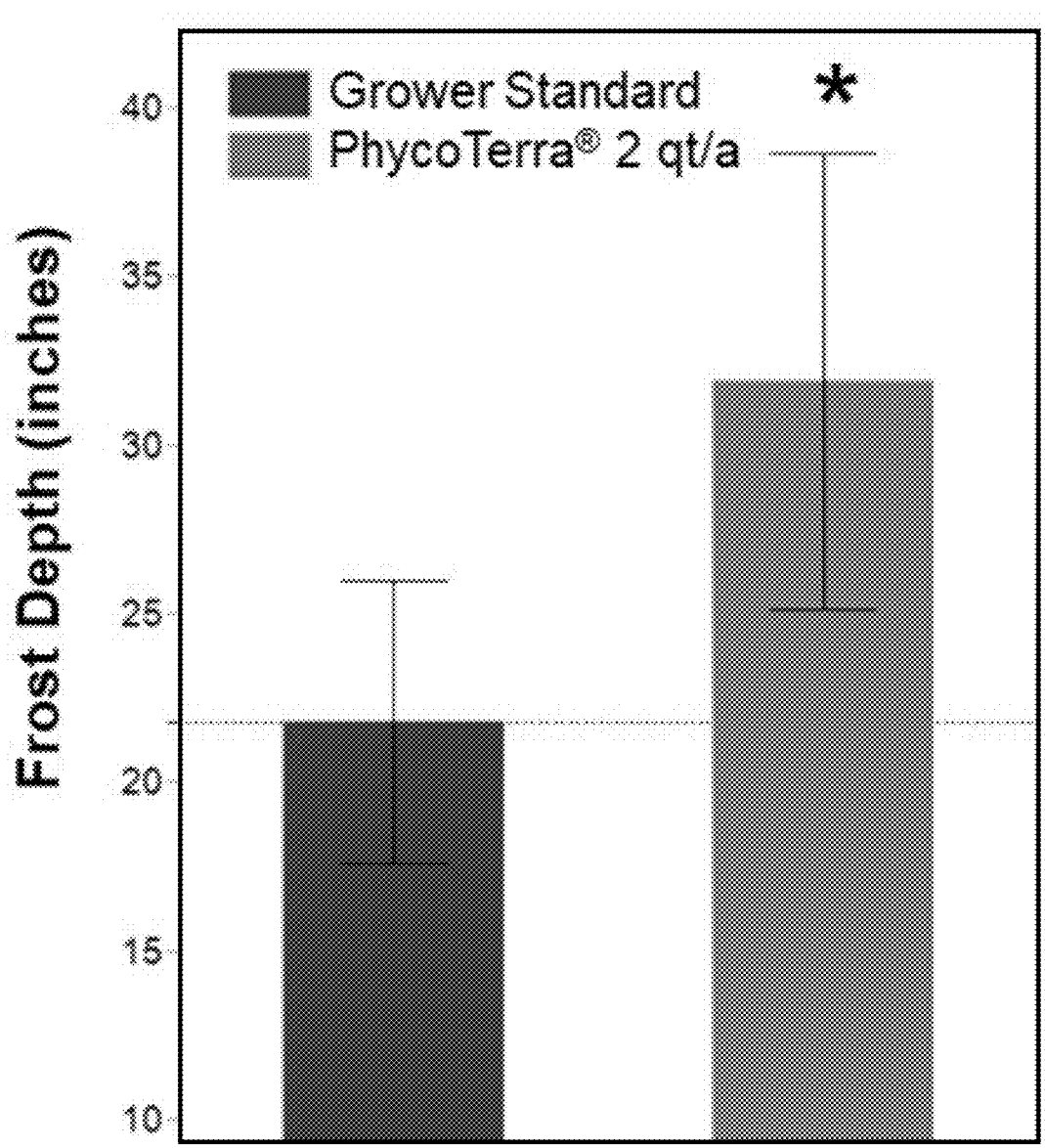
FIG. 3B depicts the average frost depth of these same two groups of fields. An asterisk indicates a significant difference between the two groups after Dunnet's analysis p<0.1.
Figure 4A:
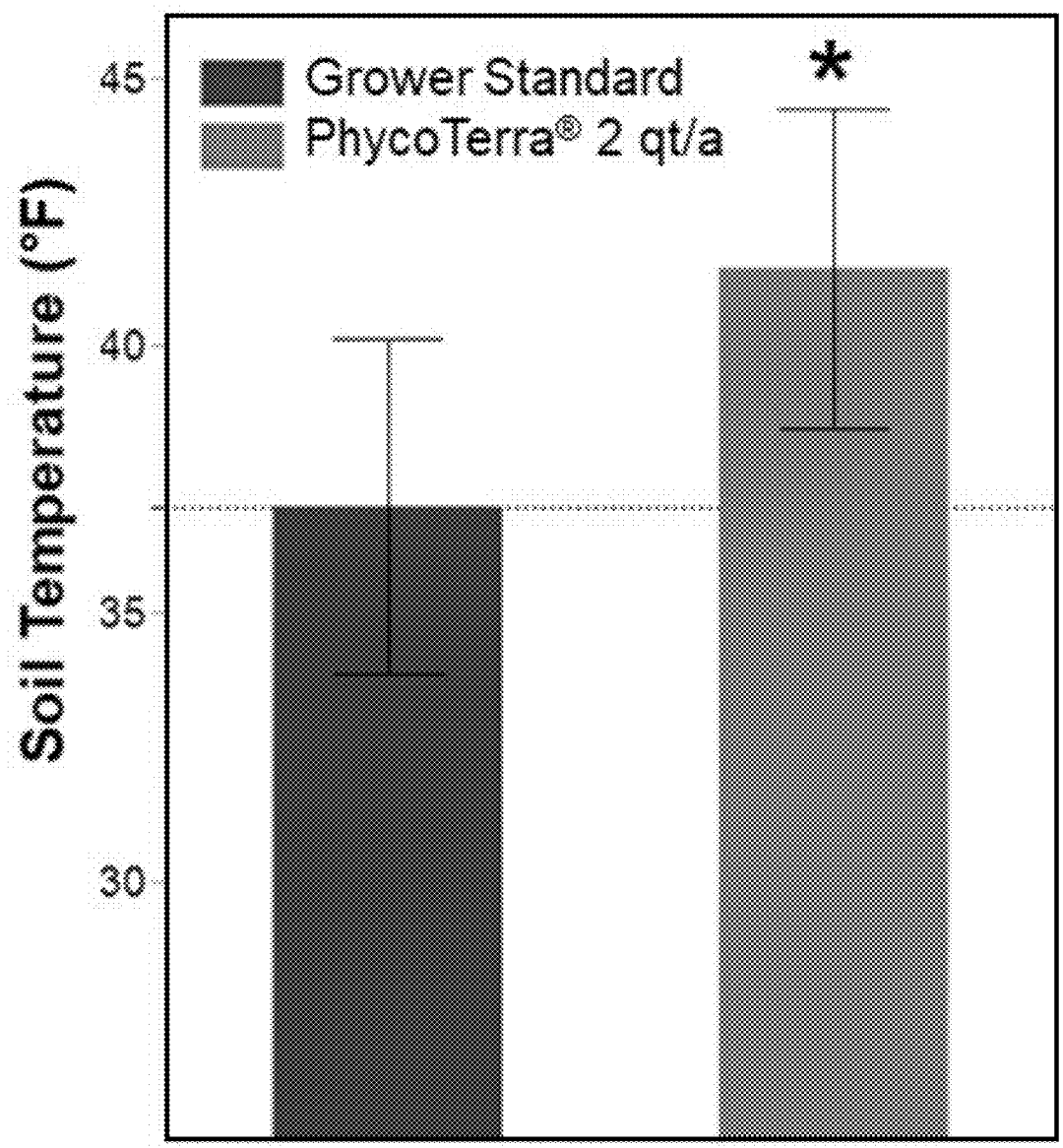
FIG. 4A depicts the average soil temperature at 6 inches of soil depth of fields treated only with burndown chemicals (i.e., herbicides) ("Grower Standard") or with the burndown chemicals and PHYCOTERRA® (whole cell *Chlorella* microalgae) applied at 2 quarts per acre ("PhycoTerra® 2 qt/a") after harvest of soybeans.
Figure 4B:
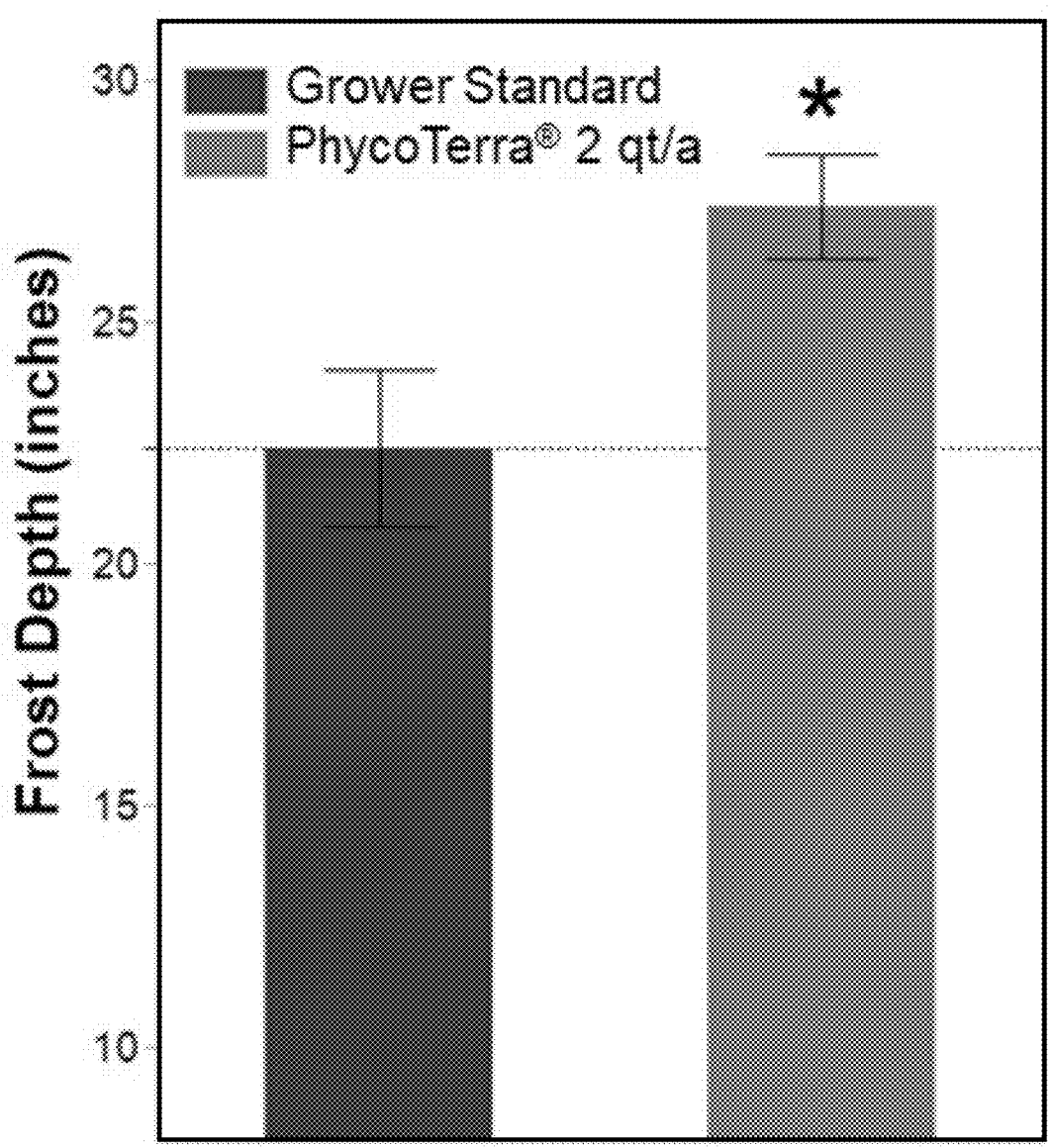
FIG. 4B depicts the average frost depth of these same two groups of fields. An asterisk indicates a significant difference between the two groups after Dunnet's analysis p<0.1.
Figure 5A:
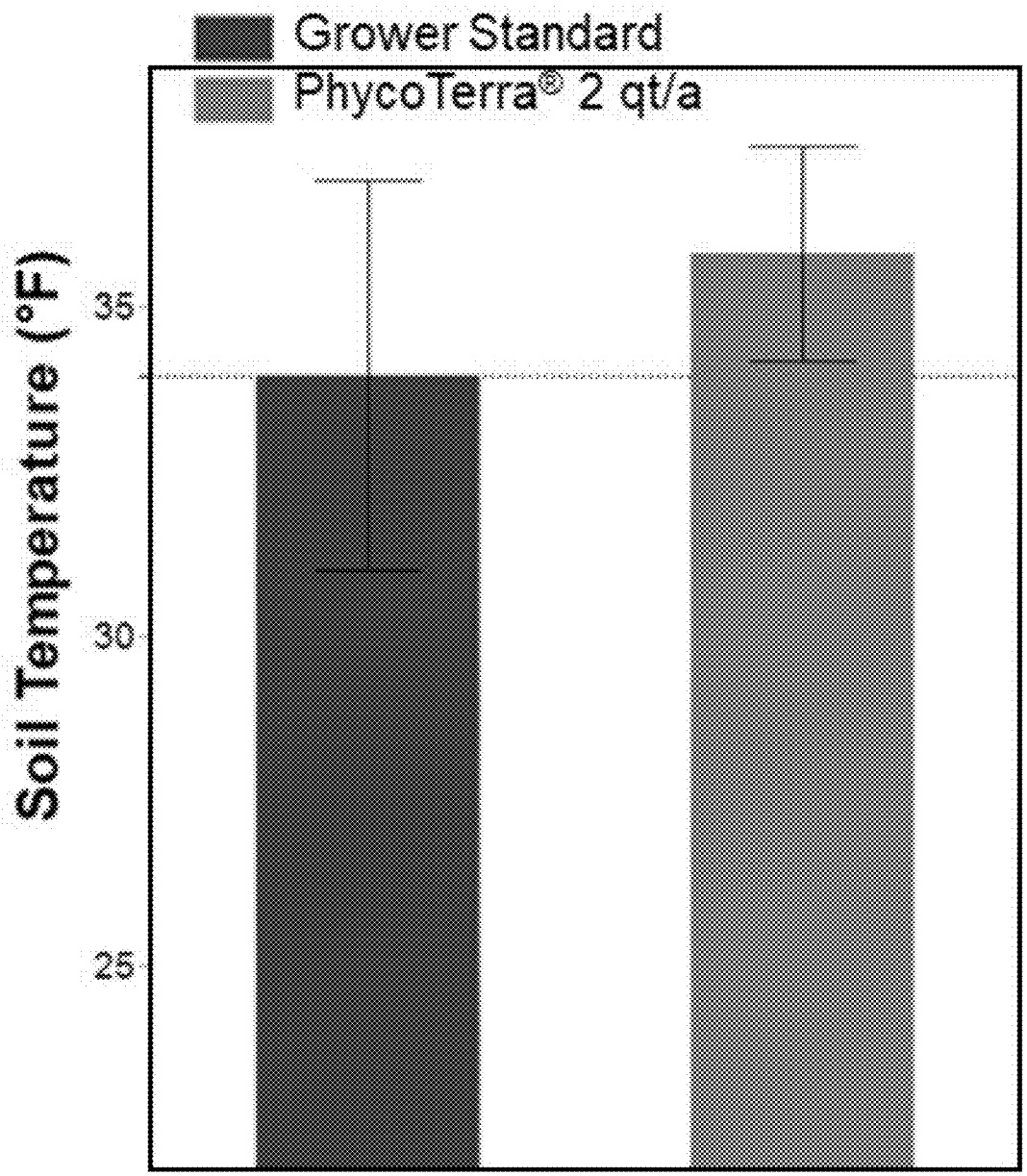
FIG. 5A depicts the average soil temperature at 6 inches of soil depth of fields treated only with burndown chemicals (i.e., herbicides) ("Grower Standard") or with the burndown chemicals and PHYCOTERRA® (whole cell *Chlorella* microalgae) applied at 2 quarts per acre ("PhycoTerra® 2 qt/a") after harvest of canola.
Figure 5B:
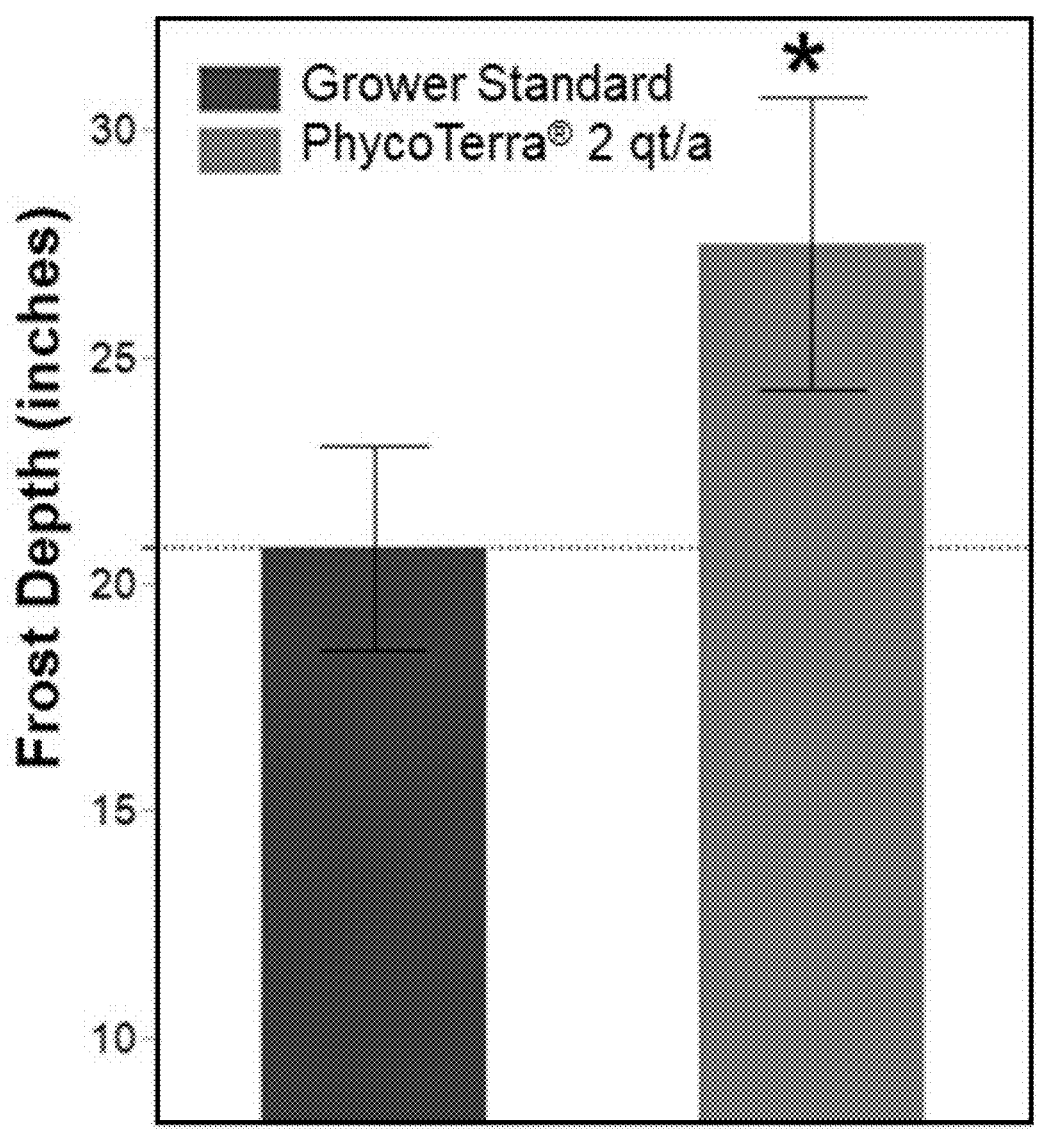
FIG. 5B depicts the average frost depth of these same two groups of fields. An asterisk indicates a significant difference between the two groups after Dunnet's analysis p<0.1.

Across all three field trials with the crop residue from different plants, the PHYCOTERRA® 2 qt/a fields consistently had higher soil temperatures than did the Grower Standard fields (see FIGS. 3A, 4A, and 5A). Moreover, the PHYCOTERRA® 2 qt/a fields also consistently had increased frost depths than did the Grower Standard fields (see FIGS. 3B, 4B, and 5B). Frost depth is measured by inserting a probe into the soil to determine how far it will penetrate before reaching frozen soil. Thus, increased frost depths are also indicative of warmer soils.

Example 6

PHYCOTERRA® (Whole Cell *Chlorella* Microalgae) Reduces Corn Crop Residue in Greenhouse Trial.

A greenhouse trial in Mesa, Arizona was conducted with corn crop residue. In this trial, the corn residue was weighed (20 grams) into tared plant litter bags, four replicates per treatment. The litter bags were placed in pots with a greenhouse soil substrate (sunshine mix #4). Treated pots received PHYCOTERRA® at an application rate of 2 qt/acre via drenching. Control pots received water only—at the same application rate as the treated pots via drenching. Treated pots and control pots were irrigated regularly, keeping the soil moisture between the wilting point and field maximum saturation.

The growing conditions were above 75% humidity with ambient temperature between 80-85° F. To quantify the amount of crop residue, the residue samples from each of the treated pots and control pots were collected four days after application and dried at 140° F. for 24 hours. The dried samples were individually weighed, and the average dry weights from the control pots and the PHYCOTERRA® pots were compared. This comparison revealed that the average dry weight of crop residue from the PHYCOTERRA®-treated litter bags was 7% ("PHYCOTERRA® 2 qt/acre treatment) less than the average dry weight of crop residue from the control litter bags.

Example 7

PHYCOTERRA® (Whole Cell *Chlorella* Microalgae) Reduces Wheat Crop Residue in Greenhouse Trial.

A greenhouse trial in Mesa, Az. was conducted with wheat crop residue. In this trial, the wheat residue was weighed (20 grams) into tared plant litter bags, four replicates per treatment. The litter bags were placed in pots with a greenhouse soil substrate (sunshine mix #4). Treated pots received PHYCOTERRA® at an application rate of 2 qt/acre via drenching. Control pots received water only—at the same application rate as the treated pots via drenching. Treated pots and control pots were irrigated regularly, keeping the soil moisture between the wilting point and field maximum saturation.

The growing conditions were above 75% humidity with ambient temperature between 80-85° F. To quantify the amount of crop residue, the residue samples from each of the treated pots and control pots were collected four days after application and dried at 140° F. for 24 hours. The dried samples were individually weighed, and the average dry weights from the control pots and the PHYCOTERRA® pots were compared. This comparison revealed that the average dry weight of crop residue from the PHYCO- TERRA®-treated litter bags was 5% ("PHYCOTERRA® 2 qt/acre treatment") less than the average dry weight of crop residue from the control litter bags.

Without wishing to be bound to any theory, the larger amounts of crop residue on the Grower Standard fields act to insulate the underlying soil thereby preventing the soil from warming up in early spring as ambient temperatures increase. In addition, these larger amounts of crop residues provide a higher reflectivity or albedo to the field surface thereby inhibiting the solar radiation from penetrating into the soil and diffusing heat.

All headings are for the convenience of the reader and should not be used to limit the meaning of the text that follows the heading, unless so specified.

Unless defined otherwise, all technical and scientific terms herein have the same meaning as commonly understood by one of ordinary skill in the art to which this invention belongs. Although any methods and materials, similar or equivalent to those described herein, can be used in the practice or testing of the present invention, the preferred methods and materials are described herein. All publications, patents, and patent publications cited are incorporated by reference herein in their entirety for all purposes.

The publications discussed herein are provided solely for their disclosure prior to the filing date of the present application. Nothing herein is to be construed as an admission that the present invention is not entitled to antedate such publication by virtue of prior invention.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

What is claimed is:

1. A method for decreasing a crop residue of a plant, the method comprising the step of applying a composition comprising *Chlorella* cells to the crop residue in a field,
    wherein the amount of crop residue after application of the composition is reduced compared to a substantially similar crop residue from the same plant without application of the composition.

2. The method of claim 1, wherein the *Chlorella* cells are whole cells, lysed cells, dried cells, cells that have been subjected to an extraction process, or a combination thereof.

3. The method of claim 1, wherein the composition is applied at a rate of between about 0.1 qt/acre (0.2 L/ha) and about 10 qt/acre (23 L/ha).

4. The method of claim 1, wherein the plant is selected from the group consisting of soybeans, corn, winter wheat, hard red spring (HRS) wheat, durum wheat, canola, cotton, almonds, peas, beans, lentils, peanuts, rice, potatoes, sugar beets, sugar cane, chickpeas, and strawberries.

5. The method of claim 1, wherein multiple applications of the composition are made to the crop residue.

6. A method for enhancing the availability of a nutrient in a crop residue of a plant, the method comprising the step of applying a composition comprising *Chlorella* cells to the crop residue in a field,
    wherein the availability of the nutrient of the crop residue after application of the composition is increased compared to the nutrient in a substantially similar crop residue from the same plant without application of the composition.

7. The method of claim 6, wherein the *Chlorella* cells are whole cells, lysed cells, dried cells, cells that have been subjected to an extraction process, or a combination thereof.

8. The method of claim 6, wherein the nutrient is nitrogen, phosphorus, potassium, calcium, magnesium, silicon, sulfur, iron, manganese, zinc, copper, boron, molybdenum, chlorine, sodium, aluminum, vanadium, nickel, cerium, dysprosium, erbium, europium, gadolinium, holmium, lanthanum, lutetium, neodymium, praseodymium, promethium, samarium, scandium, terbium, thulium, ytterbium, yttrium, or a combination thereof.

9. The method of claim 6, wherein the plant is selected from the group consisting of soybeans, corn, winter wheat, hard red spring (HRS) wheat, durum wheat, canola, cotton, almonds, peas, beans, lentils, peanuts, rice, potatoes, sugar beets, sugar cane, chickpeas, and strawberries.

10. The method of claim 6, wherein the composition is applied at a rate of between about 0.1 qt/acre (0.2 L/ha) and about 10 qt/acre (23 L/ha).

11. The method of claim 6, wherein multiple applications of the composition are made to the crop residue.

12. A method for increasing soil organic matter (SOM) with a crop residue of a plant, the method comprising the step of applying a composition comprising *Chlorella* cells to the crop residue in a field,
    wherein the SOM from the crop residue after application of the composition is increased compared to the SOM from a substantially similar crop residue from the same plant without application of the composition.

13. The method of claim 12, wherein the *Chlorella* cells are whole cells, lysed cells, dried cells, cells that have been subjected to an extraction process, or a combination thereof.

14. The method of claim 12, wherein the plant is selected from the group consisting of soybeans, corn, winter wheat, hard red spring (HRS) wheat, durum wheat, canola, cotton, almonds, peas, beans, lentils, peanuts, rice, potatoes, sugar beets, sugar cane, chickpeas, and strawberries.

15. The method of claim 12, wherein the composition is applied at a rate of between about 0.1 qt/acre (0.2 L/ha) and about 10 qt/acre (23 L/ha).

16. The method of claim 12, wherein multiple applications of the composition are made to the crop residue.

* * * * *